Patented July 4, 1933

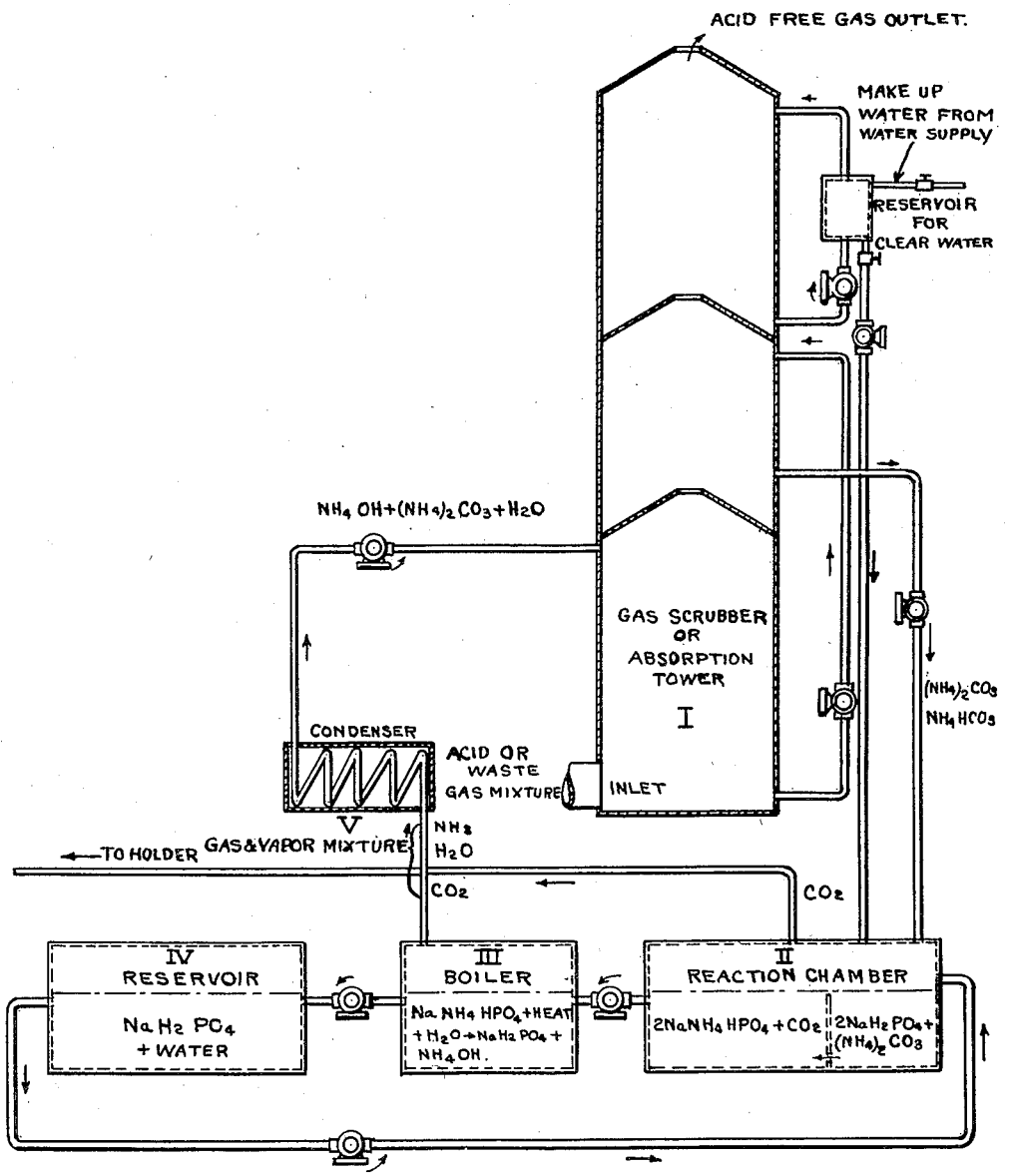

1,916,980

UNITED STATES PATENT OFFICE

GERALD J. HORVITZ, OF WOODMERE, NEW YORK

PROCESS FOR THE RECOVERY OF ACID GAS

Application filed May 22, 1931. Serial No. 539,159.

My invention relates to a process for the recovery of acid gases from gaseous mixtures and for the removal of acid gas impurities from industrial gases and its novelty consists in the steps of said process as will be more fully hereinafter pointed out.

There are many acid gases having tremendous commercial value that are daily lost with gaseous mixtures passing off into the atmosphere from industrial oil cracking, smelting or other chemical plants or operations, waste stack gases and natural gas wells.

There is no process available to save, recover or clean these valuable acid gases as there has been no process evolved which is commercially practical.

My process supplies this great commercial need and furnishes a practical way of recovering acid gases from many chemical operations making said acid gases available for use on a low cost economically sound basis and also furnishes a process for purifying industrial gases from said gases at a low cost.

My process may be applied to the separation and recovery of such gases as carbon dioxide, sulphur dioxide, hydrogen sulphide and other gases of acid reaction, either organic or inorganic, from waste gas. The process may also be applied to the removal of such gases from industrial gases such as cracker gases produced in oil refining operations or from smelting or other chemical operations where air pollution is undesirable.

In order to make the process clear and comprehensible I will apply it to the removal of carbon dioxide from waste gases of combustion and will set forth all of the steps of the process together with the chemical reactions and changes which occur so that those skilled in the art will be able to utilize my process in commercial practice.

I show in the single figure diagrammatic drawing submitted herewith the operation of my process as applied to recovery of carbon dioxide from gaseous mixtures such as waste gases of combustion.

It will be understood that this drawing is purely diagrammatic and that the various parts of the apparatus for carrying out the process as described are merely indicated in a diagrammatic manner in order to show the two complete cycles of operation involved in the partiular example of my process as described and claimed.

The various parts of the apparatus are named in accordance with the particular function of the apparatus used in carrying out my process and the chemical elements and reactions resulting in chemical changes are named at the particular portions of the apparatus where the changes occur so that an examination of the diagrammatic drawing will indicate clearly and definitely the particular apparatus used, the connections between the same and the chemical elements and combinations in each part of the apparatus.

Referring to the diagrammatic drawing, the acid or waste gas mixture is taken from the smoke stack of a commercial oil refining gas cracking operation, smelting operation or any other commercial chemical operation having acid or waste gas mixture, and is led through the inlet into the gas scrubber or absorption tower I. The liquid absorbing agent is sprayed down through the lower chamber of the gas scrubber or absorption tower I and the solution resulting therefrom is pumped up from the lower chamber into the intermediate chamber where gases of lower acid content are met by absorbing agent of lower alkaline content and the gases of a still lower acid gas content will pass on into the upper chamber of the gas scrubber I where they are met by water or an absorbing agent of still lower alkaline content so that acid free gas will pass out at the outlet at the upper end of the upper chamber. As the liquid in the first cycle is depleted from continuous operation clear water or partially saturated alkaline or ammonia salt containing solution is pumped back to the reaction chamber from reservoir for liquid circulation in upper chamber of absorption tower I to make up the deficiency in liquid then and at the same time fresh water may be run into said reservoir from the water supply.

The solution from the intermediate chamber in this instance comprises the absorbing agent (solution of ammonia and ammonium carbonate) plus acid gas (carbon dioxide) and results in ammonium carbonate plus ammonium bicarbonate in solution.

$$NH_4OH + CO_2 = NH_4HCO_3$$

$$(NH_4)_2CO_3 + CO_2 + H_2O = 2NH_4HCO_3$$

The absorbing agent now transformed to a solution of ammonium bicarbonate and ammonium carbonate, is pumped to the reaction chamber II. Upon contact and mixing with solution of sodium dihydrogen phosphate a double ammonium salt is formed with an evolution of acid gas (carbon dioxide) which is rapid and nearly complete. The solution then passes over baffles of usual construction or other mechanical device of a similar nature to give a thin film exposure so as to facilitate the expulsion of the acid gas from said solution. The liberated acid gas ($CO_2$) passes through the pipe as indicated to a holder or storage tank. The chemical reaction in the reaction chamber II is as follows:

Solution from scrubber I $$(NH_4)_2CO_3 2NH_4HCO_3 + NaH_2PO_4 = NaNH_4HPO_4 + CO_2.$$

$$(NH_4)_2CO_3 + NaH_2PO_4 = 2NaNH_4HPO_4 + CO_2 + H_2O$$

$$NH_4HCO_3 + NaH_2PO_4 = NaNH_4HPO_4 + CO_2 + H_2O.$$

The solution of sodium ammonium hydrogen phosphate remaining in the reaction chamber II is then pumped therefrom into the boiler III where the usual heat action occurs and the complex phosphate is regenerated to the sodium dihydrogen phosphate salt again and at the same time evolving ammonia water vapor and residual dissolved carbon dioxide. These gases, $NH_3$ and $CO_2$, pass with the vapor $H_2O$ to the condenser V where they are brought to a state of water solution which comprises the absorption medium $(NH_4OH) + ((NH_4)_2CO_3) + H_2O$ and which passes into the gas scrubber or absorption tower I for the purpose of recycling as described. The reactions occurring in the boiler III are as follows:

$$NaNH_4HPO_4 + Heat + H_2O = NaH_2PO_4 + H_2O + NH_3.$$

$$H_2CO_3 + Heat = CO_2 + H_2O.$$

The chemical reactions in the condenser V are as follows:

$$NH_3 + H_2O = NH_4OH.$$

$$CO_2 + H_2O = H_2CO_3$$
$$2NH_4OH + H_2CO_3 = (NH_4)_2CO_3.$$

Since under proper operating conditions ammonia or ammonium hydroxide will always be in excess, only ammonium carbonate will be formed in the condenser V. On the other hand, in the gas scrubber or absorption tower I where carbon dioxide is in excess the end reaction will be mainly to bicarbonate.

The solution of sodium ammonium hydrogen phosphate is boiled in the boiler III, the boiler III being so designed that this solution entering at one end is decomposed to sodium dihydrogen phosphate before leaving at the other end and being pumped into reservoir IV. The chemical reaction here is given under the reactions described above as occurring in boiler III.

The reservoir IV is solely for cooling and storage purposes and no chemical changes occur in the same.

From the reservoir IV the acid medium (sodium dihydrogen phosphate solution) is pumped back into the reaction chamber II where mixture with ammonia carbonate and ammonium bicarbonate solution from the gas scrubber or absorption tower I results in the formation of sodium ammonium hydrogen phosphate with the described evolution of carbon dioxide gas.

As has been stated in the process as described, there are two reaction cycles.

In the first of these cycles the acid or waste gas mixture comes through the inlet into gas scrubber or absorption tower I to which is being added ammonium hydroxide ($NH_4OH$) and ammonium carbonate (($NH_4)_2CO_3$) and water ($H_2O$). The acid free gas passes out through the upper chamber of the gas scrubber I as already described and the residue solution is drawn off from the middle chamber of the gas scrubber I and conducted by a pipe, being pumped into the reaction chamber II, said solution comprising ammonium bicarbonate ($NH_4HCO_3$) and ammonium carbonate (($NH_4)_2CO_3$) and to this sodium dihydrogen phosphate ($NaH_2PO_4$) is added in the reaction chamber II and the carbon dioxide ($CO_2$) gas passes off through the pipe provided at the top of the reaction chamber II for this purpose to the holder of usual construction and which is not shown herein.

The residue in the reaction chamber II is then pumped into the boiler III and this residue solution comprises sodium ammonium hydrogen phosphate ($NaNH_4HPO_4$) and water ($H_2O$) and, as heat is added to it, the reaction gives us sodium dihydrogen phosphate and steam or vapor ($H_2O$) which passes off through the pipe at the upper end of the boiler to the condenser V and ammonia ($NH_3$) also passes through said pipe into the condenser V and the carbonic acid ($H_2CO_3$) in this solution is broken up by the heat in the boiler III into carbon dioxide ($CO_2$) which passes off through said pipe into the condenser V and the water ($H_2O$) also passes off through said pipe into the condenser V.

In the condenser V the ammonia ($NH_3$) combines with the water ($H_2O$) to form ammonium hydroxide ($NH_4OH$) and the carbon dioxide combines with the water ($H_2O$) to form carbonic acid ($H_2CO_3$) and the 2 ammonium hydroxide ($NH_2OH$) combine with the carbonic acid ($H_2CO_3$) to form ammonium carbonate (($NH_4)_2CO_3$). This cycle is then completed by the passing of this solution from the pipe leading from the condenser V, being pumped therethrough into the upper part of the lower chamber of the gas scrubber or absorption tower I.

The second cycle involved in this process is the same as the first cycle through the chemical reactions occurring in the gas scrubber I, reaction chamber II and boiler III. At this point, after the gas and vapor mixture of ammonia ($NH_3$), water ($H_2O$) and carbon dioxide ($CO_2$) are drawn off through the pipe into the condenser V, the residue in the boiler III consists of sodium dihydrogen phosphate ($NaH_2PO_4$) and water ($H_2O$) which is pumped from the boiler III through the connecting pipe into reservoir IV where it is cooled and stored and where no chemical change occurs. From the reservoir IV the sodium dihydrogen phosphates ($NaH_2PO_4$) and water ($H_2O$) are pumped as may be required through a pipe connecting the said reservoir IV with the reaction chamber II, into the reaction chamber II to be recycled through the chemical changes occurring in reaction chamber II and boiler III, which chemical reactions and changes are common to both cycles.

It is to be definitely understood that whereas carbon dioxide is treated as the gas to be recovered in the process as set forth herein, any other acid gas may be recovered or separated from gaseous mixtures, such for example as sulphur dioxide in the handling of which sulphites and bisulphites will be formed instead of carbonates and bicarbonates.

Furthermore, it will be understood that this process will apply to organic acid gases as well as to inorganic acid gases, such organic acid gases being of the type of phenol vapor $C_6H_5OH$, hydrocyanic acid gas HCN and mercaptans $C_nH_{2n}S_2$.

In connection with the acid salt solution it will be noted that any acid salt may be used which contains more than one hydrogen ion. The mono alkaline base of this acid salt may be that of any metal such as sodium (Na), potassium (K), barium (Ba), lithium (Li), etc. but economy of operation dictates the use of sodium acid phosphate ($NaH_2PO_4$).

In the case of removing an acid gas from natural or manufactured industrial gas the purified industrial gas will be taken off for use from the acid free gas outlet at the top of the upper chamber of absorption tower I.

I claim:

1. A process of recovering waste acid gases which are unstable in solution when their normal or acid salts in solution are acted upon by an acid or acid salt of a strong acid comprising scrubbing a waste gas mixture containing an acid gas with a water solution of ammonia and ammonium carbonate, pumping said solution from the scrubbed gas into a reaction chamber and mixing with a solution of sodium dihydrogen phosphate and forming a double ammonium salt and expelling the acid gas from the solution to a holder tank, then pumping the solution to a boiler where under heat action the complex phosphate is regenerated to sodium dihydrogen phosphate salt, ammonia and residual acid gas of solution which latter two with water vapor passes to the condenser to be recycled and the remainder of sodium dihydrogen phosphate solution passing to a reservoir for cooling and thence to the reaction chamber to be recycled.

2. A process of purifying natural and manufactured industrial gases from acid gas constitutents of acid gases which are unstable in solution when their normal or acid salts in solution are acted upon by an acid or acid salt of a strong acid comprising scrubbing a gas mixture containing an acid gas with a water solution of ammonium hydroxide and ammonium carbonate, pumping said solution from the scrubbed gas into a reaction chamber containing a solution of sodium dihydrogen phosphate and mixing the same to form a double ammonium salt and evolving an acid gas and expelling said acid gas from the solution to a holder tank, then pumping the solution to a boiler and subjecting it to the action of the heat therein driving off ammonia water vapor and residual acid gas of solution to a condenser to be recycled and the remaining solution being pumped over to a reservoir for cooling and then pumped back to said reaction chamber to be recycled.

3. A process of deodorizing carbon dioxide comprising scrubbing carbon dioxide and mixtures of carbon dioxide with other non-acid gaseous constituents with a water solution of ammonia and ammonium carbonate, and securing a normal and acid carbonate of ammonia in solution, pumping the same into a reaction chamber where a partially neutralized acid having more than one acid hydrogen ion is mixed therewith forming an acid double salt and liberating the greater part of the carbon dioxide which is drawn off to a holder and pumping the residue of acid double salt and acid gas in solution into a boiler and boiling substantially all of the remaining carbon dioxide off and leading it to a condenser together with steam and ammonia gas therefrom for recycling to the scrubber and pumping the residue of monobasic salt solution over into a storage tank for cooling and then pumping it back to the reaction chamber for recycling.

4. A process of recovering acid gases which are unstable in solution when their normal or acid salts in solution are acted upon by an acid or acid salt of a strong acid comprising running a gas mixture containing an acid gas through a gas scrubber sprayed with solution of ammonia and the same salt of ammonia as that of the acid gas recovered, and pumping therefrom the normal and acid salt of ammonia and water into a reaction chamber where a monobasic salt having more than one acid hydrogen ion forms in reaction therewith an ammonia double salt liberating a greater part of the acid gas drawing it off to a holder, pumping the residue solution into a boiler and boiling off substantially all of the acid gas with ammonia gas and water vapor and leading it into a condenser and pumping it from there back into the gas scrubber and recycling as described, pumping the remainder or monobasic salt solution into a reservoir to cool and then pumping from there into the reaction chamber to be recycled.

In testimony whereof I affix my signature.

GERALD J. HORVITZ.